Jan. 17, 1933.  A. GOEBL ET AL  1,894,443

MILK COOLING AND TEMPERATURE STABILIZING DEVICE

Filed Feb. 5, 1932

WITNESSES:
A. Finck.
Florence M. Haas

INVENTORS:
Adolph Goebl
Rudolph Gedeon

Patented Jan. 17, 1933

1,894,443

UNITED STATES PATENT OFFICE

ADOLPH GOEBL AND RUDOLPH GEDEON, OF EGELSTON TOWNSHIP, MUSKEGON COUNTY, MICHIGAN

MILK COOLING AND TEMPERATURE STABILIZING DEVICE

Application filed February 5, 1932. Serial No. 591,042.

This invention relates to improvements in milk-containers and refers particularly to that class of milk cans which are destined to receive milk in a cow-warm condition to be cooled down to the most economic temperature and to be kept at that temperature until the milk reaches the distributing station.

It is well known that milk cans filled with milk, while on their way to the distributing station are often exposed for several hours to all weather conditions, as a result of which in summer the milk sometimes becomes sour and in winter it often freezes.

Any deviation from the most economic temperature deteriorates the milk and increases the work of the distributing organization, thereby causing a direct loss of money and a waste of labor to the farmer as well as to the milk distributor.

The main object of this invention is to provide a milk container which will permit the cow-warm milk to be cooled down to the most economic temperature, and that the milk will remain at said desired temperature for several hours under all weather conditions.

With the foregoing and other objects in view, which will appear as the description proceeds, the invention consists in certain new features of construction and arrangements of parts hereinafter more fully described, illustrated in the accompanying drawing, and particularly pointed out in the appended claims; it being understood that various changes in the form, proportion, size and minor details of the structure may be made without departing from the spirit or sacrificing any of the advantages of the invention.

For the purpose of facilitating an understanding of the invention, we have illustrated in the accompanying drawing a preferred embodiment thereof, from an inspection of which, when considered in connection with the following description, the invention, its mode of construction and assembly and many of its advantages shall be readily understood and appreciated. Referring to the drawing in which similar characters of reference are employed to indicate corresponding parts throughout the several figures of the drawing—

Figure 1:
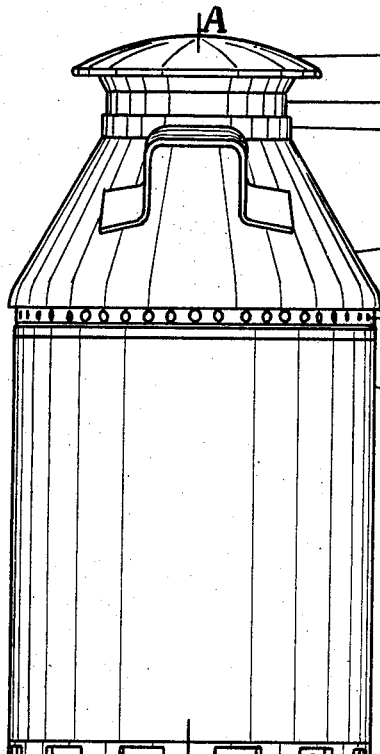
Fig. 1 shows an elevation of the invention.
Figure 2:
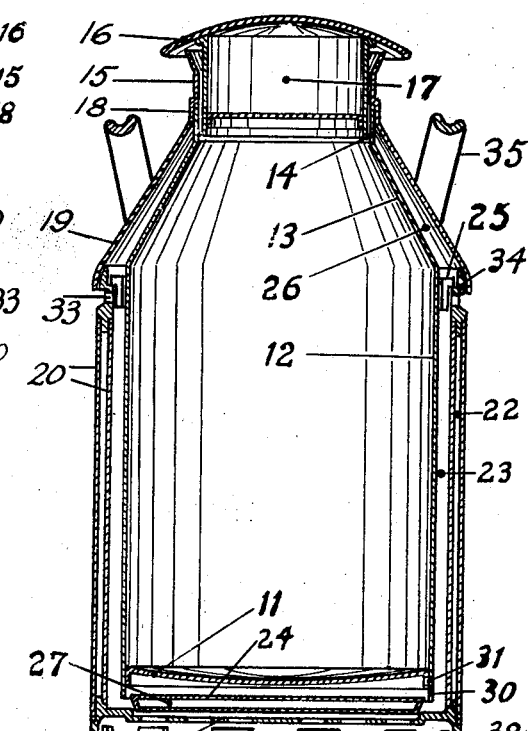
Fig. 2 shows a vertical axial section along 2—2 of Fig. 1.
Figure 3:
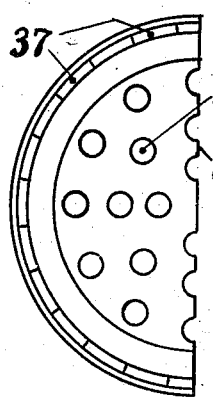
Fig. 3 shows a partial view of the protecting bottom.
Figure 4:
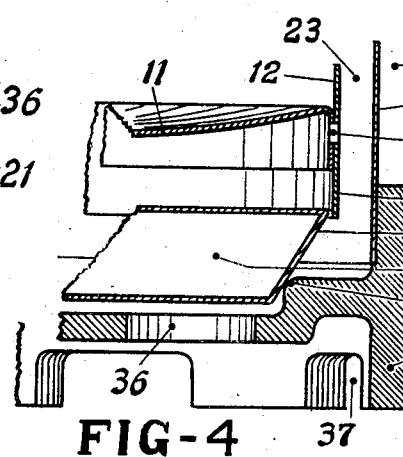
Fig. 4 shows enlarged, a portion of the bottom floating valve in its closed position.
Figure 5:
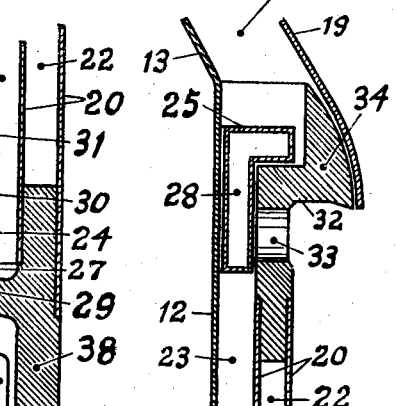
Fig. 5 shows enlarged, portion of the breast floating valve in its closed position.

This invention, stated generally, consists in the provision of a milk container having a bottom 11, a vertical wall 12, a breast 13, and a neck 14, said neck 14 being fastened airtight by any suitable mechanical method to a protecting outer-can, which upwardly forms the continuation 15, of neck 14. A cover 16, containing heat-insulating means preferably a vacuum space 17, reaches down into neck 14. Said protecting outer-can extending downward comprises an outer lower neck 18, an outer breast 19, which is equipped with handles 35, a reinforcing breastring 34, an outer vertical wall 20, and an outer protecting bottom 21. The outer vertical wall 20, contains heat-insulating means preferably a vacuum space 22. The protecting outer-can forms an airspace around the inner-can, which airspace is divided by the breast floating valve 25, into the larger lower portion 23, and a smaller upper portion 26. The lower portion 23, of said airspace is adapted for cooling the contents of said milk container. The cooling equipment comprises entrance openings 36, in the lower protecting bottom 21, a bottom floating valve 24, the lower portion 23, of the airspace, the breast floating valve 25, and exit openings 33.

The bottom floating valve 24, and the breast floating valve 25, are equipped with heat-insulating means preferably with respective vacuum spaces 27, and 28.

The application of the invention is as follows:

The milk is strained into the milk container, then the device is placed into a cold water tank, the cooling water enters the protecting bottom through the openings 36, on reaching the bottom floating valve 24, same is lifted from its base 29, whereby the water enters the airspace 23. As soon as the water reaches the breastring, the breast floating valve 25, is lifted from its base 32, whereby the water exits 33, become exposed and the water circulation begins.

To insure sufficient water entrance underneath the lower protecting bottom 21, its reinforced peripheral portion 38, is equipped with cutouts 37.

The bottom floating valve 24, while lifted from its base 29, is guided by the extending lower portion 30, of the vertical wall 12. A few small openings 31, permit the air to escape from underneath the bottom 11. After the contents of the milk container are sufficiently cooled the device is removed from the water tank in consequence of which the water leaves the circulating system through the open bottom floating valve 24, whereupon both floating valves automatically drop to their respective bases thereby closing the airspace 23.

Now, if the cover is placed upon the milk container, the device becomes a temperature stabilizer, because the heat-insulating means preferably vacuum spaces, 17, 22, 27, and 28, in combination with the closed airspaces 23, and 26, reduce the influence of climatic conditions to a minimum, thereby making it possible that the device may be exposed for several hours to all weather conditions without deteriorating the quality of the milk.

What we claim as new and desire to secure by Letters Patent is:

1. In a milk container the combination of various novel means forming together a cooling and temperature stabilizing device, comprising an inside-can, fastened with its neck airtight and rigidly to a protecting outer-can, said outer-can having heat-insulating means which, when the device is standing upright and surrounded by air, form a closed airspace around the inside-can, thus stabilizing the temperature of the contents of the inside-can; said airspace being equipped with floating valves which when submerged in water permit water to circulate through the said airspace.

2. A milk cooling and temperature stabilizing device, comprising an inner can having a cylindrical body and a cylindrical neck connected by a conical breast, the neck of said inner can fastened rigidly and airtight to a protecting outer can having an inlet opening in its bottom said outer can having heat-insulating vacuum spaces, one of which extends over the cylindrical body and is formed by two vertical walls which are fastened rigidly and airtight at their lower edge to the upper portion of the reinforced periphery of the protecting bottom and at their upper edge to the lower portion of a reinforcing breast ring having a plurality of outlet openings and which forms a valve seat, a second vacuum space located within a ring which forms a floating valve and which cooperates with the breast ring valve seat to close the outlet openings in the breast ring, a third vacuum space located above the bottom of the outer can and forming a floating valve which closes the inlet opening in the said bottom and a fourth vacuum space in a hollow cover which fits into the neck of the inner can, whereby when the device is standing upright and surrounded by air all the said vacuum spaces in connection with the breast of the outer can will form a closed air space around the inner can thus stabilizing the temperature of the contents of the inner can, but when the device is submerged in water the valves will open and permit water to circulate through the said air space.

In testimony whereof we affix our signatures.

ADOLPH GOEBL.
RUDOLPH GEDEON.